United States Patent [19]
Rickard

[11] 3,962,946
[45] June 15, 1976

[54] MAGNETIC INDUCTION STRINGED INSTRUMENT PICKUP

[75] Inventor: James H. Rickard, Harwinton, Conn.

[73] Assignee: Ovation Instruments, Inc., New Hartford, Conn.

[22] Filed: Mar. 10, 1975

[21] Appl. No.: 556,896

[52] U.S. Cl. .................................. 84/1.15; 84/1.16
[51] Int. Cl.² ........................................... G10H 3/00
[58] Field of Search .................... 84/1.01, 1.14–1.16

[56] References Cited
UNITED STATES PATENTS

| | | | |
|---|---|---|---|
| 2,817,261 | 12/1957 | Fender | 84/1.16 |
| 2,896,491 | 7/1959 | Lover | 84/1.16 X |
| 3,249,677 | 5/1966 | Burns et al. | 84/1.15 X |
| 3,472,943 | 10/1969 | Kawabata et al. | 84/1.15 |
| 3,541,219 | 11/1970 | Bair | 84/1.16 X |

*Primary Examiner*—Ulysses Weldon
*Attorney, Agent, or Firm*—McCormick, Paulding & Huber

[57] ABSTRACT

A magnetic induction type electrical pickup for a stringed musical instrument has two coils each having an opening receiving one or more permanent magnet elements. The magnet elements establish a magnetic circuit through the two coils the reluctance of which is varied by the vibration of a string to induce signal voltages in the coils. The arrangement and polarities of the permanent magnet elements, and the arrangement, winding direction and interconnection of the two coils is such as to minimize the effect of stray magnetic fields, having any random direction, on the output of the pickup. That is, the pickup is one which is highly effective in suppressing noise arising from ambient magnetic fields generated by nearby electrical devices. Also, microphonics or squeals are inhibited by construction features which repress resonant vibration of internal parts of the pickup.

14 Claims, 10 Drawing Figures

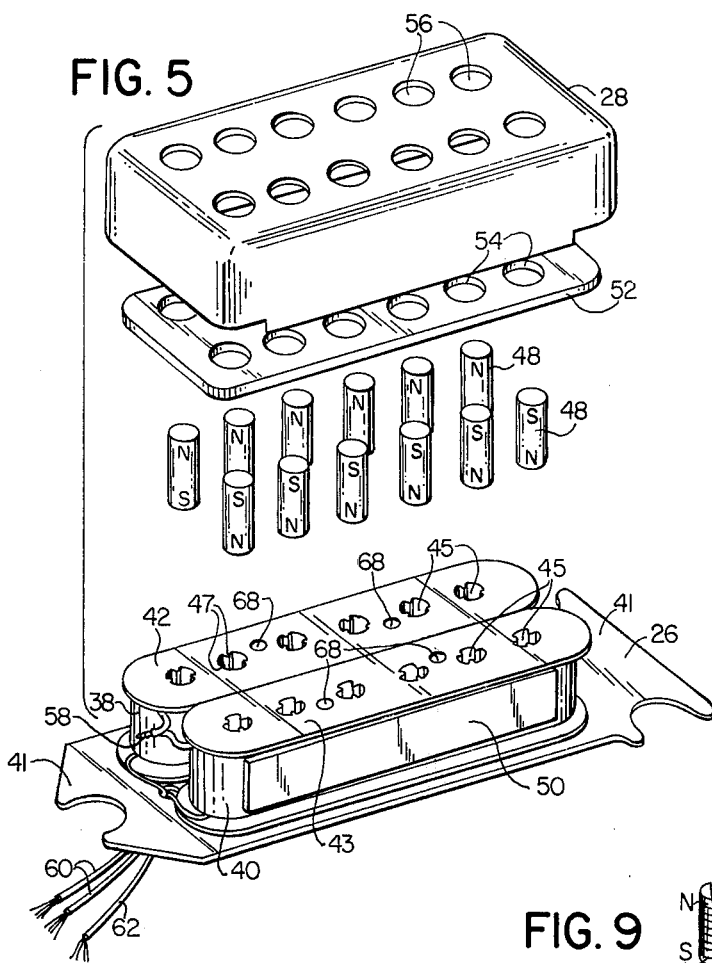
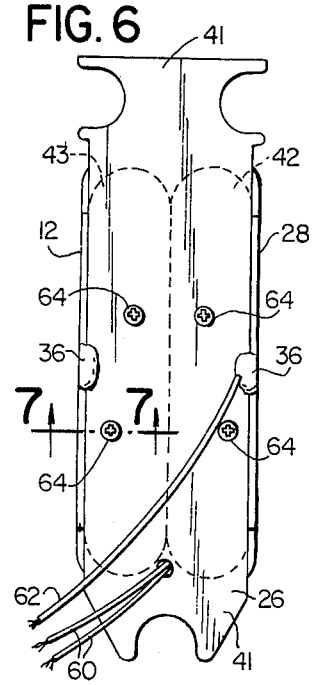
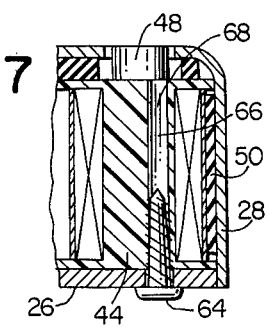
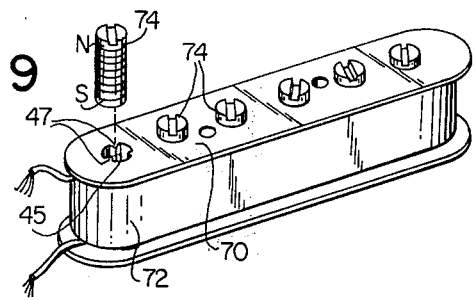
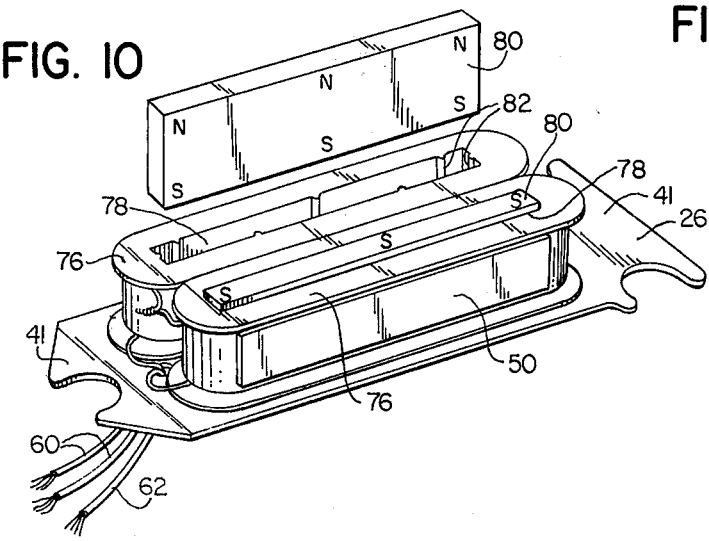

MAGNETIC INDUCTION STRINGED INSTRUMENT PICKUP

BACKGROUND OF THE INVENTION

This invention relates to magnetic induction type pickups for guitars and other stringed musical instruments, and deals more particularly with such a pickup having an improved ability to suppress hum or other noise arising from stray magnetic fields and also to suppress the production of microphonic type output signals.

Magnetic induction type pickups establish a magnetic flux circuit passing in part both through a string of the associated instrument and through an associated coil, and operate on the principle that as the string vibrates, the reluctance of the flux circuit is varied to vary the magnetic flux through the coil and to thereby generate a signal voltage in the coil. Unfortunately, electric motors, and many other pieces of common electrical apparatus tend to emit stray magnetic fields, and when magnetic induction type pickups are used in their vicinity, the stray fields often tend to couple with the pickup to produce a noise factor in the output signal of the pickup reproduced as audible noise in the output from the amplifier and speaker system driven by the pickup. Due to the very common use of 60Hz alternating current power, the stray magnetic fields in question commonly have a 60Hz frequency and in coupling with the pickup produce a 60Hz audible hum from the associated speaker.

Another problem often encountered with magnetic induction pickups is that sound vibrations in the air may be transmitted to the pickup and may set one or more internal parts of the pickup into resonant vibration to produce accompanying flux changes and output signals at the resonant frequency which, through positive feedback, sustain the resonant vibration and produce microphonic or squealing sounds from the speaker or speakers.

The general object of this invention is, therefore, to provide a magnetic induction type pickup for a stringed musical instrument which minimizes hum and other noise in its output signal by suppressing the effect of stray magnetic fields regardless of the direction of such fields and which pickup despite such noise suppressing quality nevertheless yields a high quality output signal voltage in response to the vibration of the instrument strings.

Another general object of the invention is to provide a magnetic induction type pickup for a stringed musical instrument wherein resonance of various internal parts is suppressed to avoid microphonics.

Other objects and advantages of the invention will be apparent from the accompanying drawings and from the following written description.

SUMMARY OF THE INVENTION

This invention resides in a magnetic induction type electrical pickup for a stringed musical instrument consisting of two coils which are arranged side by side between common front and rear planes with the axes of their openings being parallel to one another and perpendicular to such planes. Each coil has at least one permanent magnet element extending axially through its opening. The permanent magnet elements of the two coils are oppositely magnetically poled. That is, the permanent magnet element of one coil has a north magnetic pole adjacent the front plane and a south magnetic pole adjacent the rear plane and the permanent magnet element of the other coil has a south magnetic pole adjacent the front plane and a north magnetic pole adjacent the rear plane, so that the magnet elements establish a magnetic flux circuit passing through both coils via the magnet elements and passing through the air from one magnet element to the other at the front and rear ends of the magnet elements. Additionally, the two coils are electrically connected in series with one another and so wound that an electrical current passing serially through them passes clockwise through one coil and counterclockwise through the other coil. As a result, flux variations due to a vibrating string of magnetic material extending through the front air portion of the flux circuit induces similar voltages in the two coils which are serially added to one another and appear across the two output leads of the pickup. On the other hand, flux from a stray magnetic field and having a direction parallel to the coil axes passes through both coils in the same direction, and the voltages which are induced thereby in the two coils oppose and cancel one another so as to produce no output voltage across the two output leads of the pickup. Also, a stray magnetic field having any direction in a plane perpendicular to the coil axes links no turns of either coil and, therefore, induces no output voltage in either coil. Further, the direction of the flux in the front air portion of the flux circuit is opposite to its direction in the rear air portion of the circuit so that any stray magnetic flux having a direction such as to assist or oppose the flux of one air circuit will have an opposite and cancelling effect on the flux of the other air circuit and will, therefore, have little or no effect on the flux passing through the two coils.

Preferably, the two coils are elongated in a direction perpendicular to their axes so that their openings extend transversely across the full set of strings of the instrument and preferably each opening includes either one magnet element for each of the strings or a single transversely elongated magnet providing a single magnetic pole face extending transversely across the full set of strings.

The invention also resides in assembling the parts of the aforesaid pickup in such a manner as to dampen the vibration of certain parts to suppress microphonics. In particular, the coils are wound on bobbins having openings for the associated magnets, and each magnet is separated from the major portion of its opening wall by a vibration dampening layer of silicone rubber or other resilient material. Resilient pads are also placed between the pickup housing and the pickup parts enclosed thereby for the same purpose.

BRIEF DESCRIPTION OF THE DRAWINGS

FIG. 5 is an exploded perspective view of the pickup of FIG. 2.

FIG. 6 is a rear view of the pickup of FIG. 2.

FIG. 7 is a fragmentary sectional view taken on the line 6—6 of FIG. 6.

FIG. 9 is a perspective view of a coil, bobbin and magnet assembly which may be used in a pickup similar to that of FIGS. 2 - 7, and in place of the corresponding assemblies there shown, to make an alternative embodiment of the invention.

FIG. 10 is a perspective view showing two coil, bobbin and magnet assemblies which may be substituted for those of FIGS. 1 - 7 to make another alternative embodiment of the invention.

DETAILED DESCRIPTION OF THE PREFERRED EMBODIMENTS

Figure 1:
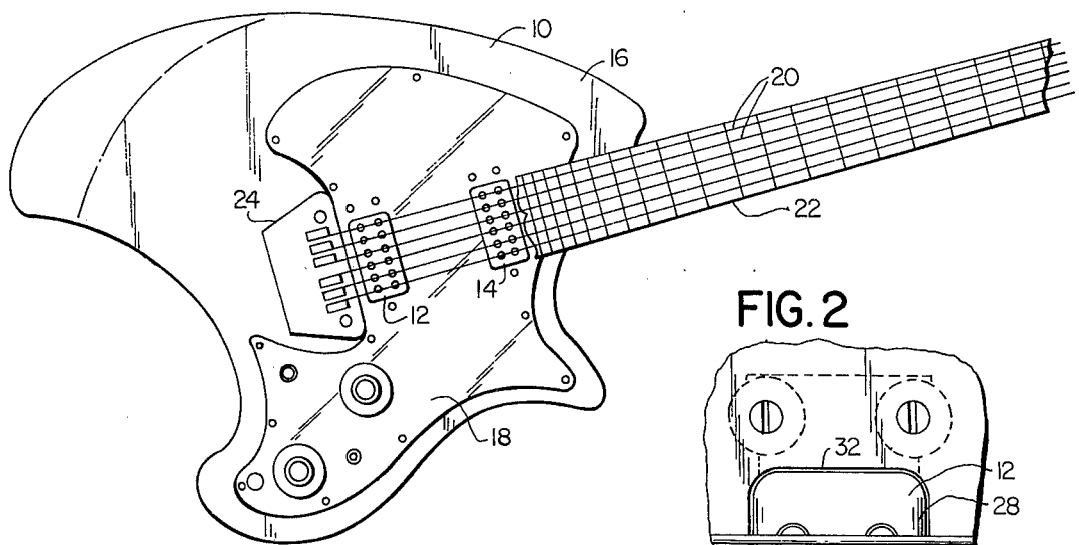
FIG. 1 is a partial plan view of a guitar having two electrical pickups each embodying this invention.

FIG. 1 shows a solid body guitar 10 having two electrical magnetic pickups 12 and 14 located in cavities in the guitar body 16 covered by a pick guard or plate 18 attached to the front surface of the body. Each pickup projects outwardly from its cavity through an opening in the pick guard toward the overlying set of strings 20, 20 extending along the length of a neck 22 and attached at their lower ends to the guitar body 16 by a bridge and tail piece unit 24. The manner in which each pickup is mounted from the guitar body may vary widely, but preferably the mounting system is such as shown in the copending patent application filed simultaneously herewith and entitled PICKUP MOUNTING FOR STRINGED INSTRUMENT, Ser. No. 556,897 to which reference may be had for further details of its construction.

A solid body guitar having two pickups has been shown in FIG. 1 by way of example only, and it should be understood that the pickup of this invention may be used with various different styles of guitars including those having only a single pickup or more than two pickups. In FIGS. 2 - 5, the illustrated pickup is taken to be the pickup 12 of FIG. 1.

Referring to FIGS. 2 - 5, the pickup 12 there illustrated includes a hollow housing consisting of flat base plate 26 and a cup-shaped housing member 28 having two side walls 30, 30, two end walls 32, 32 and a top wall 34. The housing member 28 and base plate 26 are both made of brass or similar electrically conducting nonmagnetic material and they are fastened and electrically connected to one another by spots of solder 36, 36 on the rear surface of the base plate. Together the housing member and base plate, therefore, define an electrically shielded cavity in which the remainder of the pickup components are housed. At each end of the housing member, the base plate extends beyond the housing member to provide a mounting flange 41 used to attach the pickup to the guitar body, the two illustrated mounting flanges 41, 41 being shaped to adapt the pickup to the mounting system of the aforesaid co-pending patent application.

Within the housing cavity of the pickup are two electrical coils 38 and 40 which are arranged side by side on the base plate 26 with the axes of their openings parallel to one another and generally perpendicular to the base plate 26. Each coil is elongated along a line of elongation extending generally transversely of the strings 20, 20 so that each coil opening has a length slightly greater than the spacing between the two farthest apart strings. The two coils are received respectively on two bobbins 42 and 43 made of a nonmagnetic material such as Delrin or other plastic. Each bobbin in turn includes an elongated body portion 44 around which the associated coil is wound and two end flanges 46, 46 at opposite ends of the body portion between which the associated coil is located. Each flange 46 has a generally flat outwardly facing surface. Each one end flange of each bobbin rests flatly against the base plate 26 as shown best in FIG. 3.

The body portion 44 of each bobbin 42 or 43 includes a plurality of openings 45, 45 extending axially therethrough, there being one such opening for each of the strings 20, 20 and each opening, in use, being arranged to lie directly beneath a respective one of the strings. Each opening is of generally circular cross section and each receives a generally cylindrical permanent magnet element 48.

The base plate 26 defines a rear plane for the pickup and the front ends or flanges of the two bobbins define a front plane for the pickup. Each permanent magnet element 48 extends between such front and rear planes. Further, all of the permanent magnet elements 48, 48 of the coil 38 and bobbin 42 have south magnetic poles adjacent the rear plane or base plate 36 and north magnetic poles adjacent the front plane; whereas, all of the permanent magnet elements 48, 48 of the coil 40 and bobbin 43 have north magnetic poles adjacent the rear plane and south magnetic poles adjacent the front plane.

Each coil 38 and 40 has one side facing one of the side walls 30, 30 of the housing member 28 and between each such coil side and housing side wall 30 is an interposed pad 50 of rubber or similar resilient material. Each pad 50 is held in a slightly compressed state by the coil and the adjacent side wall 30 and, therefore, acts to dampen vibration of the housing side wall relative to the coil. Without such pad, the housing may, as a result of exciting vibrations in the air, tend to resonant or ring at certain frequencies and through such vibration produce changing capacitances which become coupled with the electrical signal produced by the coils to produce a microphonic or squealing output from the associated sound system. For the same purpose, another pad 52 of rubber or similar resilient material is interposed between the top wall 34 of the housing and the front ends of the bobbins 42 and 43, the pad 52 also being held in a slightly compressed state to dampen vibration of the top wall.

Figure 3:
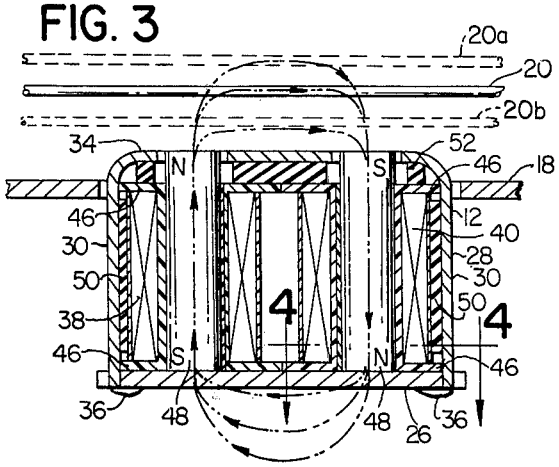
FIG. 3 is a still further enlarged cross sectional view taken on the line 3—3 of FIG. 2.
Figure 4:
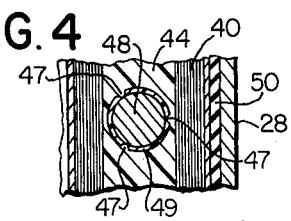
FIG. 4 is a fragmentary sectional view taken on the line 4—4 of FIG. 3.

As shown best in FIGS. 3 and 5, each permanent magnet element 48 extends a small distance beyond the front end of its associated bobbin. To accommodate this, the pad 52 includes a plurality of openings 54, 54, and the housing top wall 34 includes a plurality of registering openings 56, 56 which receive the forwardly projecting portions of the magnet elements.

The permanent magnet elements 48, 48 are also mounted in their associated bobbins in such a manner as to dampen vibration between them and the bobbins to inhibit microphonic noise arising from such vibration. For this purpose, each bobbin opening 45 has a cross section slightly larger than the cross section of its associated magnet element and a layer 49 of resilient material, such as a silicone rubber potting agent, is interposed between the magnet element and the bobbin, as shown best in FIG. 4. Preferably, and as shown, each opening 45 has three axial ribs 47, 47 which project radially inwardly from the major portion of the interior surface of the opening. These ribs engage and center the associated permanent magnet element 48 in spaced relationship with the opening. Therefore, in assembling the elements 48, 48 with the bobbins, they may first be inserted into the openings 45, 45 and then the resilient material of the layers 49, 49 may be poured in liquid form into the spaces between the elements and their opening walls, the ribs holding the elements in their proper positions while the resilient material cures.

Figure 8:
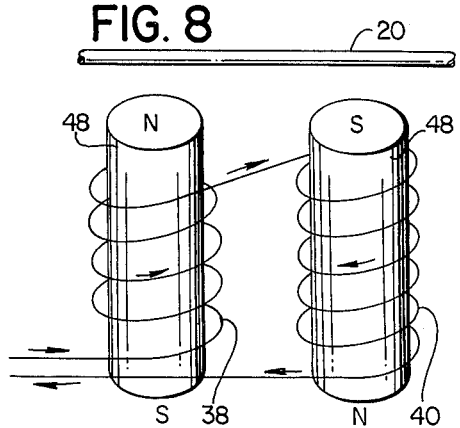
FIG. 8 is a schematic diagram showing the direction of winding and electrical interconnection of the two coils of the pickup of FIG. 2.

As shown best in FIG. 5, each coil 38 and 40 has two end leads at one of its rounded transverse ends, and the two coils, and their associated bobbins, are placed on the base plate 26 so that each has its leads at the same end of the base plate. The coils are electrically connected in series with one another in such a manner that an electric current in passing through one coil flows in a clockwise direction around its associated set of permanent magnet elements 48, 48 and in passing through the other coil flows around its set of permanent magnet elements 48, 48 in the opposite or counterclockwise direction. This is shown schematically in FIG. 8 which for convenience shows only one of the magnets 48 of the coil 38 and one of the magnets 48 of the coil 40. The connection is actually made, as shown in FIG. 5, by connecting the two upper leads of the two coils together as at 58. The two bottom leads 60, 60 pass through a hole in the base plate 26 and become the output leads for the pickup across which the pickup signal appears. Another lead 62 is also connected to the base plate 26, as by one of the solder spots 36, as shown in FIG. 6, for grounding the pickup.

Each bobbin 42 and 43 is fixed to the base plate 26 by two screws 64, 64 which pass through openings in the base plate and threadably engage a corresponding pair of fastener openings in the associated bobbin body portion. The arrangement of the base plate openings and the fastener openings in the bobbins is such that the two coil and bobbin assemblies are identical with one another and the only way in which they can be attached to the base plate, with their leads at the same end of the base plate, is in such a relative arrangement that when the two upper coil leads (or alternatively the two bottom coil leads) are connected, as at 58, the current necessarily flows through the two coils in opposite directions. This is an aid to the manufacture and assembly of the pickup since both of the coil and bobbin assemblies may be made identical with each other and it assures that the correct interconnection of the two coils of the pickup will occur if two coil and bobbin assemblies are attached to the base plate with their leads at the same end of the base plate and the two upper (or two lower leads) are connected to one another.

The means for assuring that the two bobbin and coil assemblies are attached to the base plate in the proper relationship is as follows. Referring to FIGS. 6 and 7, it will be understood that the four screws 64, 64 pass through openings in the base plate, and from FIG. 6 it will be seen that the two base plate openings associated with one of the bobbins have a relative arrangement which is the mirror image, taken along a line extending between the two bobbins, of the relative arrangement of the two base plate openings associated with the other bobbin. Each bobbin, as evident from FIGS. 5 and 7, has two axial fastener holes extending completely through the body portion of the bobbin and, therefore, the two holes form two openings 68, 68 on each of the two end faces of the bobbin. The arrangement of the fastener holes is such that when a bobbin and coil assembly is placed on the base plate 26 with the coil leads at the left-hand end of the base plate, as seen in FIG. 5, if the bobbin is turned so that one of its end faces is adjacent the base plate then the openings 68, 68 in that end face of the bobbin will match one but not the other of the sets of base plate openings, and if the bobbin is turned so that its other end face is adjacent the base plate, then the openings in that end face will match with the other set of base plate openings. Thus, the case of the two coil bobbin assemblies shown in FIG. 5, one of them is turned "upside down" relative to the other so that when the two upper leads are connected, as at 58, the desired connection as respect to coil winding direction is obtained.

Figure 2:
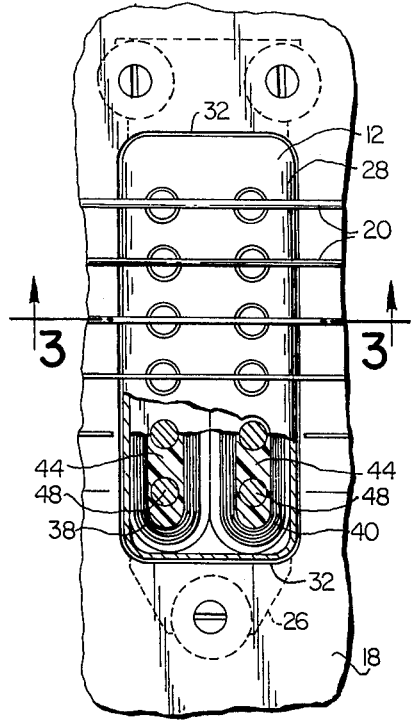
FIG. 2 is an enlarged plan view of one of the pickups of FIG. 1 with portions of the pickup being shown broken away to reveal other details.

Having now described the construction of the pickup 12, its functioning may be discussed with reference to FIGS. 2 and 3. As shown in FIG. 2, the arrangement of the pickup in use is such that each string 20, 20 of the associated instrument extends over and across two of the permanent magnet elements 48, 48, one of such two elements being in the coil 38 and the other element being in the coil 40. As shown in FIG. 3, the two permanent magnet elements 48, 48 associated with each string 20 set up a magnetic field having a continuous flux path indicated by the broken lines in FIG. 3. This flux path has two portions in which the lines of flux pass respectively through the two permanent magnet elements 48, 48 in opposite directions. It also has two air portions. One of these air portions is located to the rear of the pickup and in it the lines of flux pass between the rear ends of the two permanent magnet elements. The other air portion of the flux path is located to the front of the pickup and in it the lines of flux pass between the two front ends of the two magnet elements. The associated string 20 is situated in the front air portion of the flux path so that some of the flux of this air portion passes through it. The string is made at least in part of steel or other magnetic material and when set into vibration, during the playing of the instrument, moves away from and toward the front end of the pickup as indicated by the broken line showings 20a and 20b of the string in FIG. 3. More lines of flux of the front air portion of the flux circuit will pass through the string 20 when it is close to the pickup than when far from the pickup. Thus, the vibration of the string effectively changes the reluctance of the front air portion of the flux circuit and varies the amount of flux passing through each of the two permanent magnets 48, 48 and thereby induces signal voltages in the two coils 38 and 40. Since the flux has opposite directions through the two permanent magnet elements and since the two coils 38 and 40 are serially connected in the manner shown in FIG. 8, the signals induced by the string vibration in the two coils will be in series aiding relation to one another and will combine to produce an output signal at the two output leads 60, 60.

If a stray magnetic field is present and has a direction parallel to the axes of the magnet elements 48, 48 such field will pass in the same direction through all of the permanent magnet elements and induce signals in the two coils 38 and 40 which are of opposite polarity so as to oppose and effectively cancel one another to produce no output at the two output leads 60, 60. If the stray magnetic field has a direction perpendicular to the axes of the permanent magnet elements and parallel to the strings 20, 20, it will cut no turns of either of the coils 38 and 40. Also, it will oppose the flux in one of the air portions of the flux circuit and will aid the flux in the other air portion of the flux circuit, so that the net effect will be to induce no signals in either of the two coils. If the stray magnetic flux is perpendicular to the axes of the permanent magnet elements and perpendicular to the strings 20, 20, then it will neither oppose nor aid the flux in either of the two air portions nor will it cut any of the windings of either of the two coils, and no signal will appear at the two output leads of the pickup. Accordingly, regardless of the direction of the stray magnetic field, coupling of such field with the normal output signal generated by the vibrating strings is suppressed.

It may sometimes be desirable to vary the heights of the permanent magnet elements relative to the associated strings 20, 20 and when this is the case, a coil, bobbin and magnet assembly similar to that shown in FIG. 9 may be used for each of the two such assemblies in the pickup 12 as shown and previously described in connection with FIGS. 1 – 7. Referring to FIG. 9, the bobbin 70 and coil 72 there shown are similar to the bobbins and coils previously described. The permanent magnet elements 74, 74, however, are externally threaded and provided with slots at their upper ends. The threads of each magnet in turn threadably engage the locating ribs 47, 47 associated with the opening 45 in the bobbin which receives the magnet. Therefore, by rotating each permanent magnet element 74, as by means of a screw driver placed in its slot, the element may be threaded either into or out of its opening to raise or lower its front end relative to the string. In this case, each element 74 may be designed to self thread itself into threaded engagement with the ribs of its opening.

Also, instead of each coil and bobbin assembly being provided with a separate magnet element, such as the previously described magnet elements 48, 48, for each string, a single magnet may be used for each such assembly. Such a combination is shown in FIG. 10 wherein each of the illustrated bobbins has a single elongated central opening 78 receiving a correspondingly shaped bar magnet 80. Each bar magnet 80 is of such a length as to extend transversely across the full set of strings 20, 20 of the instrument with which the pickup is used and has one magnetic pole at its upper edge and an opposite magnetic pole at its lower edge. The arrangement of these poles is in turn similar to those of the previously described pickup 12 in that of the two coil, bobbin and magnet assemblies on the base plate 26, one magnet has a north magnetic pole along its forward edge and south magnetic pole at its rear edge and the other magnet has a south magnetic pole along its forward edge and a north magnetic pole along its forward edge and a north magnetic pole along its rear edge. The bobbin opening which receives each magnet 80 also preferably includes a number of axial ribs 82, 82 for holding the magnet in place and for providing a space between the magnet and the adjacent surface of the bobbin to allow the interposition of a quantity of silicone rubber or similar resilient material for damping vibration between the magnet and the bobbin.

I claim:

1. An electrical pickup for a stringed musical instrument, said pickup comprising a hollow housing of electrically conductive non-magnetic material, first and second coils each having an opening with an axis and each having a front end and a rear end, said two coils being arranged side by side and next to one another within said housing with said axes of their openings parallel to one another, a first permanent magnet element extending axially through the opening of said first coil, a second permanent magnet element extending axially through the opening of said second coil, said first magnet element having a front end with a north magnetic pole adjacent said front end of said first coil and a rear end with a south magnetic pole adjacent said rear end of said first coil, and said second magnet element having a front end with a south magnetic pole adjacent said front end of said second coil and a rear end with a north magnetic pole adjacent said rear end of said second coil, said two coils having substantially equal numbers of turns and each having two end leads, and means electrically connecting one end lead of said first coil solely to one end lead of said second coil so that the electrical circuit between the other two of said end leads consists solely of said two coils connected in series with one another in such a way that an electric current in passing serially through said two coils passes clockwise through one coil and counterclockwise through the other of said coils as viewed looking toward said front ends of said coils, said rear ends of said first and second permanent magnet elements being magnetically separated from one another by material having substantially the permeability of air and said front ends of said first and second permanent magnet elements being magnetically separated from one another by material having substantially the permeability of air, and two bobbins of non-magnetic material on each of which a respective one of said two coils is wound, each of said bobbins having a body portion passing through the opening of its associated coil and said body portion having a hole receiving a respective one of said first and second permanent magnet elements, each of said holes being larger in cross section than its associated permanent magnet element and being defined by a major interior surface and a plurality of projections extending radially inwardly from said major interior surface and engaging the associated one of said permanent magnet elements to hold it in spaced relation to said major interior surface, and a material having the resiliency of silicone rubber filling the spaces between each of said permanent magnet elements and said major interior surface of its associated bobbin hole for dampening vibration of said magnet elements relative to said bobbins.

2. An electrical pickup for a stringed musical instrument as defined in claim 1 further characterized by each of said bobbins having a body portion passing through the opening of its associated coil and two flanges located at opposite ends of said body portion, said housing including a base plate of electrically conductive material against which one flange of each of said bobbins rests, and a plurality of threaded fasteners for each of said bobbins which fasteners pass through said base plate and threadably engage said body portion of the associated one of said bobbins, said two bobbins and said two coils forming two bobbin and coil subassemblies which are identical with one another, each of said subassemblies having a front and a rear coil lead at one end of said base plate, said base plate having a first set of openings for the threaded fasteners associated with the first of said bobbins and a second set of openings for the threaded fasteners associated with the second of said bobbins, the arrangement of said first set of base plate openings relative to one another being a mirror image taken along a line passing between said two bobbins of the arrangement of said second set of base plate openings relative to one another, each of said bobbins having a set of fastener holes passing axially completely through its body portion so as to form a set of openings on each end of the bobbin, said fastener holes being so arranged that when said bobbin has one end adjacent said base plate the set of openings formed thereby in said one end match with only one of said sets of base plate openings and when said bobbin has its other end adjacent said base plate the set of openings formed by said fastener holes in said other end match with only the other of said sets of base plate openings.

3. An electrical pickup of the magnetic induction type for a stringed musical instrument, said electrical pickup comprising a coil, a bobbin of non-magnetic material having a body portion passing through the opening of said coil and on which said coil is wound, said body portion of said bobbin having a hole therein extending parallel to the axis of said coil, an element of magnetic material received in said bobbin hole, said hole of said bobbin being larger in cross section than said element, a material having the resiliency of silicone rubber filling the space between said element and the surface of said bobbin defining said bobbin hole for dampening vibration of said element relative to said bobbin, said surface defining said bobbin hole including a major portion spaced from said element and a plurality of projections extending radially inwardly from said major portion and engaging said element to locate it relative to said major portion.

4. An electrical pickup as defined in claim 3 further characterized by said material having the resiliency of silicone rubber being a silicone rubber.

5. An electrical pickup as defined in claim 3 further characterized by said coil and said bobbin body portion being elongated along a line of elongation generally perpendicular to the axis of said coil, said hole in said body portion being one of a plurality of such holes, and said element of magnetic material being one of a plurality of such elements of magnetic material, each of said elements being received in a respective one of said bobbin holes and each of said bobbin holes being larger in cross section than its associated element, and a material having a resiliency generally similar to that of silicone rubber filling the space between each of said elements and the surface of said bobbin defining its associated bobbin hole for dampening vibration of said element relative to said bobbin.

6. An electrical pickup as defined in claim 5 further characterized by each of said elements of magnetic material being a permanent magnet.

7. An electrical pickup of the magnetic induction type for a stringed musical instrument, said pickup comprising a bobbin of non-magnetic material having a body portion, a coil wound on said body portion of said bobbin, said body portion of said bobbin and said coil being elongated along a line of elongation generally perpendicular to the axis of said coil, said body portion of said bobbin having a plurality of holes therein with axes generally parallel to the axis of said coil, a plurality of elements of magnetic material each received in a respective one of said bobbin holes, a base plate to which said bobbin is fixed with the axis of said coil generally perpendicular to said base plate, and a cup-shaped housing member of electrically conductive non-magnetic material attached to said base plate and with said base plate forming a cavity within which said bobbin, coil and elements of magnetic material are received, said housing having two side walls, two end walls and a top wall, said coil having one side face facing one of said housing side walls, and a pad of material having the resiliency of silicone rubber interposed in a slightly compressed state between said one side of said coil and the adjacent side wall of said housing member to dampen vibration of said side wall relative to said coil.

8. An electrical pickup of the magnetic induction type for a stringed musical instrument, said pickup comprising a bobbin of non-magnetic material having a body portion, a coil wound on said body portion of said bobbin, said body portion of said bobbin and said coil being elongated along a line of elongation generally perpendicular to the axis of said coil, and said body portion of said bobbin having a plurality of holes with axes generally parallel to the axis of said coil, a plurality of elements of magnetic material each received in a respective one of said bobbin holes, a base plate to which said bobbin is fixed with the axis of said coil generally perpendicular to said base plate, and a cup-shaped housing member of electrically conductive non-magnetic material attached to said base plate and with said base plate forming a cavity within which said bobbin, coil and elements of magnetic material are received, said housing member having two side walls, two end walls and a top wall, said bobbin having one end facing said housing top wall, and a pad of material having the resiliency of silicone rubber interposed in a slightly compressed state between said one end of said bobbin and said housing top wall to dampen vibration of said top wall relative to said bobbin.

9. An electrical pickup for a stringed musical instrument having a set of transversely spaced parallel strings, said pickup comprising first and second coils each having an opening with an axis, said two coils being arranged side by side with said axes of their openings parallel to one another, said two coils extending axially between parallel front and rear planes common to both coils so that each coil has one axial end located in said front plane and the other axial end located in said rear plane, a first permanent magnet element extending axially through the opening of said first coil, a second permanent magnet element extending axially through the opening of said second coil, said first magnet element having an end with a north magnetic pole adjacent said front plane and another end with a south magnetic pole adjacent said rear plane and said second magnet element having an end with a south magnetic pole adjacent said front plane and another end with a north magnetic pole adjacent said rear plane whereby said two magnet elements establish a magnetic flux circuit which passes axially in opposite directions through said two coils and which flux circuit has a rear air portion extending in one direction between the rear plane ends of said magnet elements and a front air portion extending in the opposite direction between the front plane ends of said magnet elements, and means electrically connecting said two coils in series with one another in such a manner that an electric current in passing serially through said two coils passes clockwise through one coil and counterclockwise through the other of said coils, each of said coil openings being elongated along a line of elongation perpendicular to the associated opening axis, the two lines of elongation of the two coils being parallel to one another, said first permanent magnet element being one of a plurality of first permanent magnet elements extending axially through the opening of said first coil and spaced from one another along the associated line of coil elongation, said second permanent magnet element likewise being one of a plurality of second permanent magnet elements extending axially through the opening of said second coil and spaced from one another along the associated line of coil elongation, each of said coils being wound on a bobbin of non-magnetic material, each of said bobbins having a body portion passing through the opening of its associated coil and said body portion of each bobbin having a plurality of holes each receiving a respective one of said permanent magnet elements, each of said holes being larger in cross section than its associated permanent magnet element and being defined by a major interior surface and a plurality of projections extending radially inwardly from said major interior surface and enagaging said associated permanent magnet element to hole it in spaced relation to said major interior surface, and a material havng the resiliency of silicone rubber filling the spaces between each of said permanent magnet elements and said major interior surface of its associated bobbin hole.

10. An electrical pickup as defined in claim 9 further characterized by said material having the resiliency of silicone rubber being a silicone rubber.

11. An electrical pickup for a stringed musical instrument having a set of transversely spaced parallel strings, said pickup comprising first and second coils each having an opening with an axis, said two coils being arranged side by side with said axes of their openings parallel to one another, said two coils extending axially between parallel front and rear planes common to both coils so that each coil has one axial end located in said front plane and the other axial end located in said rear plane, a first permanent magnet element extending axially through the opening of said first coil, a second permanent magnet element extending axially through the opening of said second coil, said first magnet element having an end with a north magnetic pole adjacent said front plane and another end with a south magnetic pole adjacent said rear plane and said second magnet element having an end with a south magnetic pole adjacent said front plane and another end with a north magnetic pole adjacent said rear plane whereby said two magnet elements establish a magnetic flux circuit which passes axially in opposite directions through said two coils and which flux circuit has a rear air portion extending in one direction between the rear plane ends of said magnet elements and a front air portion extending in the opposite direction between the front plane ends of said magnet elements, and means electrically connecting said two coils in series with one another in such a manner that an electric current in passing serially through said two coils passes clockwise through one coil and counterclockwise through the other of said coils, each of said coil openings being elongated along a line of elongation perpendicular to the associated opening axis, the two lines of elongation of the two coils being parallel to one another, said first permanent magnet element being the only one of such received in the opening of said first coil and being elongated along the associated line of elongation, said second permanent magnet element being the only one of such received in the opening of said second coil and being elongated along the associated line of elongation, each of said coils being wound on a bobbin of non-magnetic material, each of said bobbins having a body portion passing through the opening of its associated coil and said body portion of each bobbin having a hole for receiving the associated one of said permanent magnet elements, said hole of each bobbin being larger in cross section than its associated permanent magnet element and being defined by a major interior surface and a plurality of projections extending radially inwardly from said major interior surface and engaging the associated permanent magnet element to hold it in spaced relation to said major interior surface, and a material having the resiliency of silicone rubber filling the space between each of said permanent magnet elements and said major interior surface of its associated bobbin hole.

12. An electrical pickup as defined in claim 11 further characterized by said material having the resiliency of silicone rubber being a silicone rubber.

13. An electrical pickup for a stringed musical instrument having a set of transversely spaced parallel strings, said pickup comprising a hollow housing of electrically conductive non-magnetic material, first and second coils each having an opening with an axis, said two coils being axially between parallel front and side by side and next to one another within said housing with said axes of their openings parallel to one another, said two coils extending axially between parallel front and rear planes common to both coils so that each coil has one axial end located in said front plane and the other axial end located in said rear plane, a first permanent magnet element extending axially through the opening of said first coil, a second permanent magnet element extending axially through the opening of said second coil each of said coils being wound on a bobbin of non-magnetic material, each of said bobbins having a body portion passing through the opening of its associated coil and said body portion of each bobbin having a hole for receiving the associated one of said permanent magnet elements, said first magnet element having an end with a north magnetic pole adjacent said front plane and another end with a south magnetic pole adjacent said reak plane and said second magnet element having an end with a south magnetic pole adjacent said front plane and another end with a north magnetic pole adjacent said rear plane whereby said two magnet elements establish a magnetic flux circuit which passes axially in opposite directions through said two coils and which flux circuit has a rear air portion extending in one direction between the rear plane ends of said magnet elements and a front air portion extending in the opposite direction between the front plane ends of said magnet elements, said two coils having substantially equal numbers of turns and each having two end leads, and means electrically connecting one end lead of said first coil solely to one end lead of said second coil so that the electrical circuit between the other two of said end leads consists solely of said two coils connected in series with one another in such a way that an electric current in passing serially through said two coils passes clockwise through one coil and counterclockwise through the other of said coils as viewed looking toward said front ends of said coils, said housing forming a cavity receiving said coils, bobbins and permanent magnet elements, said housing having a front wall and each of said bobbins having a front end facing said front wall of said housing, and a pad of material having the resiliency of silicone rubber located between said front walls of said housing and said front ends of said bobbins.

14. An electrical pickup for a stringed musical instrument having a set of transversely spaced parallel strings, said pickup comprising a hollow housing of electrically conductive non-magnetic material, first and second coils each having an opening with an axis, said two coils being arranged side by side and next to one another within said housing with said axes of their openings parallel to one another, said two coils extending axially between parallel front and rear planes common to both coils so that each coil has one axial end located in said front plane and the other axial end located in said rear plane, a first permanent magnet element extending axially through the opening of said first coil, a second permanent magnet element extending axially through the opening of said second coil, said first magnet element having an end with a north magnetic pole adjacent said front plane and another end with a south magnetic pole adjacent said rear plane and said second magnet element having an end with a south magnetic pole adjacent said front plane and another end with a north magnetic pole adjacent said rear plane whereby said two magnet elements establish a magnetic flux circuit which passes axially in opposite directions through said two coils and which flux circuit has a rear air portion extending in one direction between the rear plane ends of said magnet elements and a front air portion extending in the opposite direction between the front plane ends of said magnet elements, said two coils having substantially equal numbers of turns and each having two end leads, and means electrically connecting one end lead of said first coil solely to one end lead of said second coil so that the electrical circuit between the other two of said end leads consists solely of said two coils connected in series with one another in such a way that an electric current in passing serially through said two coils passes clockwise through one coil and counterclockwise through the other of said coils as viewed looking toward said front ends of said coils, a housing of electrically conducting non-magnetic material forming a cavity receiving said coils, bobbins and permanent magnet elements, said housing having two side walls and each of said coils having one side facing a respective one of said side walls of said housing, and a pad of material having the resiliency of silicone rubber interposed between said one said of each coil and the adjacent one of said housing side walls.

* * * * *

UNITED STATES PATENT OFFICE
CERTIFICATE OF CORRECTION

Patent No. 3,962,946            Dated June 15, 1976

Inventor(s) James H. Rickard

It is certified that error appears in the above-identified patent and that said Letters Patent are hereby corrected as shown below:

Col. 8, line 44, after "permanent" insert the word --magnet--

Col. 11, line 19, "hole" should read --hold--

Col. 12, line 23, after "being" delete --axially between parallel front and--

Col. 12, line 23, after "being" insert the word --arranged--

Col. 12, line 41, "reak" should read --rear--

Col. 14, line 22, "one said" should read --one side--

Signed and Sealed this

Thirty-first Day of August 1976

[SEAL]

Attest:

RUTH C. MASON  
*Attesting Officer*

C. MARSHALL DANN  
*Commissioner of Patents and Trademarks*